3,751,497
**PROCESS FOR THE PRODUCTION OF CYCLO-
PENTENE FROM CYCLOPENTADIENE**
Wulf Schwerdtel, Cologne, Wolfgang Swodenk, Odenthal-
Globusch, and Peter Woernle, Leverkusen, Germany,
assignors to Bayer Aktiengesellschaft, Leverkusen, Germany
No Drawing. Filed May 21, 1971, Ser. No. 145,914
Claims priority, application Germany, May 25, 1970,
P 20 25 411.9
Int. Cl. C07c 13/12, 5/16
U.S. Cl. 260—666 A                8 Claims

ABSTRACT OF THE DISCLOSURE

The process for the production of cyclopentene from cyclopentadiene which comprises partially hydrogenating cyclopentadiene with molecular hydrogen in the gas phase at a temperature of about 50 to 300° C. in the presence of a novel catalyst comprising a support and, as active material, by weight of the catalyst, about 0.1 to 2% of palladium and about 0.2 to 2% of chromium, titanium or mixtures thereof.

---

This invention relates to a process for the production of cyclopentene from cyclopentadiene by the partial catalytic hydrogenation of cyclopentadiene with molecular hydrogen using a supporting catalyst containing palladium with additions of chromium and/or titanium.

Processes for the production of cyclopentene from cyclopentadiene by hydrogenation with molecular hydrogen are already known and described in numerous publications. Unfortunately, all these processes have serious disadvantages.

Thus, hydrogenation on for example modified nickel catalysts (nickel on kieselguhr, Raney nickel, nickel molybdite), in the liquid phase and in the gas phase, has already been described (Rec. Trav. chim. Pays Bas 58, 329–377 (1939); United States patent specifications No. 2,360,555 and 2,584,531). However, high selectivities are only obtained in this process if the cyclopentadiene conversion is low. Another disadvantage is that, apart from their sensitivity to sulfur, the nickel catalysts used cannot be regenerated.

Although hydrogenation is selective in the gas-phase hydrogenation process on pyrophoric metallic nickel, cobalt, molybdenum or tungsten and their oxides or sulfides optionally with supports and, in some cases, with addition of ZnO, $MnO_2$ or $Cr_2O_3$ (cf. United States patent specification No. 2,793,238), the conversions obtained are extremely poor. Further disadvantages are that the pyrophoric catalysts used are dangerous to handle, cannot always be regenerated and are sensitive to sulfur.

In addition, Ni/Mgo, $Ni/Cr_2O_3$, Ni/Al, Co (Fischer catalyst) have been described as catalysts for the gas-phase and liquid-phase hydrogenation of cyclopentadiene (cf. United States patent specification No. 2,887,517 and German patent specification No. 969,563). Although the yields of cyclopentene are high, the catalysts described, in addition to the disadvantages referred to in connection with nickel catalysts, have the further disadvantage that it is only possible to obtain limited throughputs of cyclopentadiene in view of the long reaction times required. The hydrogenation of cyclopentadiene on Ni supported on $Al_2O_3$ only gives cyclopentene yields of 30% (cf. British patent specification 919,702).

The gas phase and liquid phase hydrogenation of diolefins into monoolefins on sulfides of Ru, Pd and Pt, optionally with supports, has also been described (cf. United States patent specification No. 3,408,415). In this case, too, it is only possible to obtain low diolefin conversions, especially in the gas phase. Since in this process it is usually necessary to add sulfur-containing compounds with the starting product in order to maintain the sulfidic from the catalysts, a sulfur-containing reaction product is obtained.

Palladium supported catalysts with additions of heavy metals such as copper, silver, zinc, cadmium, mercury, thallium, lead, antimony and/or iron, for the hydrogenation of diolefinic cyclic compounds into the corresponding monoolefinic compounds are described in German patent specification No. 1,181,700. This specification emphasizes the need to carry out hydrogenation preferably in the presence of diluents or solvents, optionally using amines, at moderate temperatures below 100° C. in order to increase the level of selectivity, because the selectivity of the catalysts claimed falls as the temperatures rises.

There is no reference to the use of these catalysts for hydrogenating cyclopentadiene into cyclopentene in the gas phase.

It is an object of the present invention to provide a process for producing cyclopentene from cyclopentadiene selectively and in high conversion and yield.

It is another object to provide a novel catalyst capable of effecting such reduction of cyclopentadiene.

It has now been found that these and other objects and advantages can be realized by partially hydrogenating cyclopentadiene with molecular hydrogen in the gas phase at temperatures above 50° C. in the presence of a supporting catalyst containing palladium with additions of chromium and/or titanium as the active components. A lithium/aluminum spinel which contains up to about 2.6% of lithium and which has an inner surface of less than about 100 m.²/g. and preferably from about 10 to 30 m.²/g., is advantageously used as the catalyst support. As active component, the catalyst contains, by weight, from about 0.1 to 2% of palladium and about 0.2 to 2% of chromium, titanium or mixtures thereof. Preferably, the palladium content is about 0.2 to 1%, and the content of chromium and/or titanium is at least about 0.5% with neither being present in excess of about 1.5%. The catalyst may contain either or both chromium and titanium and their relative proportions may be varied widely. For example, there can be 100 parts of titanium to 1 part of chromium or 100 parts of chromium to 1 part of titanium. The total active component content makes up from about 0.3 to 4% by weight of the supporting catalysts according to the invention.

The advantages of the process according to the invention over conventional processes are as follows:

(1) The cyclopentadiene conversion is substantially quantitative. Unreacted cyclopentadiene which dimerizes and makes the product of hydrogenation difficult to work up does not accumulate. To recycle cyclopentadiene dimerized into dicyclopentadiene would require previous monomerization with all the costs and losses which this involves.

(2) Selectivity is in excess of 90%. The formation of worthless cyclopentane through non-selective over-hydrogenation of the cyclopentadien which also makes the cyclopentene difficult to work up and in addition causes a loss in yield is substantially eliminated.

(3) The process is carried out with short residence times with the result that high throughputs are obtained through small reactors, which technically is of considerable advantage.

(4) The catalyst according to the invention makes it possible to operate at temperatures at which the re-dimerization and polymerization of cyclopentadiene are largely eliminated so that there is no danger of oligomers and polymers being deposited on to the catalyst. As a result, the catalysts can remain in use for prolonged periods.

(5) Hydrogenation can be carried out in the absence of diluents or solvents on the catalyst according to the invention so that the cyclopentene can be isolated particularly economically.

(6) Hydrogenation on the catalyst according to the invention can be carried out over a wide range of loads. The selectivity of the catalyst is largely independent of the cyclopentadiene conversion, of the overall throughput and of the hydrogen excess so that in cases where the process according to the invention is carried out on a commercial scale it is also possible to operate with overloads or subloads.

In general, the gas phase hydrogenation of cyclopentadiene with the catalyst according to the invention is carried out by mixing freshly prepared cyclopentadiene vapor with an at least molar quantity of hydrogen and reacting the resulting mixture in a reactor, preferably a tubular reactor, in which the catalyst is fixedly arranged, in either an upward or downward flow.

Hydrogenation takes place in the gas phase at temperatures above about 50° C., generally at temperatures of from about 50 to 300° C. and preferably at temperatures of from about 50 to 200° C., and at normal or slightly elevated pressure. The molar ratio of hydrogen to cyclopentadiene is between about 3 and 1, and advantageously between about 2.5 and 1.5. The residence times (volume of catalyst zone per volume of gas/sec.) are between about 0.3 and 15 seconds and advantageously between about 0.5 and 10 seconds.

Cyclopentene yields of around 90% are obtained for a single throughput through the tubular reactor under the aforementioned conditions.

The gaseous reaction product is normally condensed, for which purpose it is possible to operate with cooling or even under additional compression. The unreacted hydrogen is advantageously recycled with some cyclopentene into the hydrogenation stage. The cyclopentene can be further purified by methods known per se, for example by distillation, extractive distillation or extraction.

The catalyst according to the invention can also be prepared by methods known per se.

Suitable supports include the usual materials such as aluminum oxide, kieselguhr, pumice, meerschaum, active carbon etc.

It is preferred to use a lithium/aluminum spinel support containing up to about 2.6% of especially about 2.4 to 2.6% lithium with an inner surface of less than about 100 m.$^2$/g. which can be prepared as known per se, for example as follows:

Active forms of the aluminum oxide. preferably $\gamma$-Al$_2$O$_3$ with an inner surface of for example 250 m.$^2$/g., are impregnated at around 30° C. with an aqueous solution of a lithium salt in a quantity corresponding to its absorption capacity, and the impregnated Al$_2$O$_3$ is dried at around 150° C. If necessary, impregnation is repeated several times. After drying, the support is tempered for several hours at temperatures above about 800° C. to form the spinel.

To prepare the catalyst, a support, for example, the aforementioned lithium/aluminum spinel, is treated with a solution of palladium, chromium and/or titanium compounds. In general, any processes which enable the support to be impregnated with a solution of the active catalytic substances may be used to produce the catalyst according to the invention. The palladium, chromium and titanium compound can be applied to the support in the form of a common solution or in the form of separate solutions in any order by single or repeated treatment, the metals being used in the form of compounds soluble in water, acids or alkalis or in organic solvents. The supporting material can be impregnated either superficially or throughout.

The metal compounds can be reduced into the active metallic form by reduction in the gas phases or liquid phase or even by ordinary heat treatment. Reduction can be carried out for example with hydrazine, formaldehyde or formic acid in the liquid phase, or with CO, CH$_4$ or H$_2$ in the gas phase.

Application of the metal compound to the supporting materials and conversion of the metal compound into the active metallic form can be carried out separately for each component or at the same time. After the active catalytic substance has been formed on the catalyst, any foreign ions left from preparation are washed out. The completed catalyst is then dried preferably at elevated temperature, for example at temperatures of from about 50° C. to 150° C.

The process according to the invention is illustrated by the following examples:

EXAMPLE 1

A fresh cyclopentadiene (CPD) obtained from a commercial C$_5$-hydrocarbon mixture, accumulating as head product in a purity of around 90% during the dissociation of crude dicyclopentadiene (DCP) by distillation and following rectification, was used for hydrogenation.

Analysis of the starting product (in percent by volume):

| | |
|---|---|
| CPD | 90.56 |
| CPE [1] | 1.91 |
| CPA [2] | 1.46 |
| Isoprene | 0.97 |
| Amylenes | 0.85 |
| Pentanes | 0.09 |
| DCP | 0.3 |
| Unknown | 2.85 |

[1] Cyclopentene.
[2] Cyclopentane.

The cyclopentadiene delivered from a calibrated dropping funnel by means of a small piston pump was evaporated in a pre-heater, mixed with hydrogen the quantity of which was cotnrolled through a rotameter and the gas mixture passed continuously through a glass tube (40 cm. long, 1.1 cm. in diameter) externally heated with oil and containing 19 ml. of the catalyst identified in Table 1 with a grain size of from 1 to 3 mm. The temperature of the oil circuit was regulated by a thermostat, while the reactor inlet and outlet temperature was followed with thermometer. The gaseous reaction mixture was condensed and collected in a cold trap. The quantity of unreacted hydrogen was measured with a gas meter.

The composition of the liquid reaction product was determined by gas chromatography. The hydrogenation conditions and results of hydrogenation are set out in Table 1.

The expressions conversion, selectivity and yield used are defined as follows:

cyclopentadiene (CPD) conversion $$= \frac{\text{moles of CPD reacted}}{\text{moles of CPD used}} \cdot 100\%$$

cyclopententene (CPE) selectivity $$= \frac{\text{moles of CPE formed}}{\text{moles of CPD reacted}} \cdot 100\%$$

$$\text{cyclopentene yield} = \frac{\text{moles of CPE formed}}{\text{moles of CPD used}} \cdot 100\%$$

Conversion $\times$ selectivity = yield

TABLE 1

| Catalyst | Molar ratio, H₂:CPD | Residence time, sec. | Reactor temp., °C (outlet) | CPD conversion, percent | CPE selectivity, percent | CPE yield, percent |
|---|---|---|---|---|---|---|
| A | 1.0 | 0.75 | 50 | 92 | 92 | 84.6 |
| B | 1.0 | 0.5 | 60 | 95 | 94 | 89.1 |
| C | 1.0 | 0.5 | 60 | 91 | 95 | 86.1 |
| D¹ | 1.0 | 0.75 | 60 | 98 | 77 | 75.4 |
| E¹ | 1.0 | 0.75 | 60 | 35 | 83 | 29.1 |

¹ Comparison test.

NOTE.—
A=0.68% Pd plus 1.1% Cr on Li/Al spinel.
B=0.42% Pd plus 1.4% Ti on Li/Al spinel.
C=0.51% Pd plus 0.7% Cr plus 0.6% Ti on Li/Al spinel.
D=0.66% Pd plus 3.8% Cr on Li/Al spinel (for comparison test).
E=0.42% Pd plus 2.5% Ti on Li/Al spinel (for comparison test).

A lithium/aluminum spinel with a lithium content of 2.5% and an inner surface of 14 m.²/g., was used as supporting material for catalysts A to E, having been produced as follows:

2.86 liters of γ-Al₂O₃ with an inner surface of approximately 250 m.²/g. were impregnated with 1 liter of aqueous solution at 30° C. into which 296 g. of formic acid and 233 g. of a 54% aqueous lithium hydroxide solution had been successively introduced. The impregnated Al₂O₃ was dried in vacuo at 150° C., reimpregnated with the same solution and then dried again in vacuo at 150° C. The support was then tempered for 6 hours at 1050° C. to form the spinel.

To prepare catalyst A containing 0.68% Pd and 1.12% of Cr, 700 ml. of the spinel described above were impregnated with 240 ml. of an aqueous solution containing 26 g. of CrCl₃, 6H₂O and 16.6 ml. of a 15% solution of Na₂PdCl₄ in hydrochloric acid, the impregnated support was reduced for 2 hours with an aqueous solution containing 10% of NaOH and 10% of N₂H₄, washed free from chloride with water for 12 hours and then dried in vacuo at 150° C. over a period of about 12 hours. To prepare catalyst B containing 0.42% of Pd and 1.4% of Ti, 650 ml. of the spinel described above were impregnated with 260 ml. of an ethanolic solution in which 15 ml. of TiCl₄, 10 ml. of concentrated HCl and 5.38 g. of PdCl₂ had been successively dissolved. The impregnated support was hydrolyzed with 10% sodium hydroxide solution, dried in air, oxidized with air for 5 hours at 500° C. and then reduced with hydrogen for 4 hours at 50° C.

Catalysts C, D and E were prepared in the same way as catalysts A and B with the corresponding quantities of metal salts.

Table 1 shows how the catalysts according to the invention work: cyclopentadiene was hydrogenated with conversions and selectivities in excess of 90% to form cyclopentene in a yield of 84.6% on a catalyst containing 0.68% of Pd and 1.1% of Cr on lithium/aluminum spinel (catalyst A).

CPD was hydrogenated equally successfully on a catalyst containing 0.42% of Pd and 1.4% of Ti on spinel (catalyst B) and on a catalyst containing 0.51% of Pd, 0.7% of Cr and 0.6% of Ti on spinel (catalyst C).

The conversions and selectivities were all in excess of 90%. Although cyclopentadiene was also hydrogenated to cyclopentene in a conversion of 94% on a catalyst containing 0.66% of Pd and 3.8% of Cr on spinel (catalyst D) under the same conditions as those used for catalyst A, the yield of cyclopentene only amounted to 75.4% on account of the poorer selectivity. Accordingly, it can be seen that in the event of too great an addition of chromium (in excess of 2%) selectivity is reduced in relation to the catalyst A according to the invention.

The catalyst E containing 2.5% of titanium also shows that the addition of titanium in a quantity greater than that in which it is present in the catalyst B according to the invention considerably reduces the cyclopentene yield.

The high activity of the claimed catalysts coupled with their outstanding selectivity is reflected in the short reaction time which is less than 1 second.

EXAMPLE 2

A cyclopentadien starting material as in Example 1 was continuously hydrogenated for 700 hours in a steam-heated tubular reactor 200 cm. long with an internal diameter of 2.5 cm. (900 ml. catalyst volume, grain size 5 mm.).

A lithium/aluminum spinel containing 0.68% of Pd and 1.1% of Cr (catalyst A of Example 1) was used as the catalyst.

Samples were taken inter alia after 63 hours, after 400 hours and after 700 hours and calculations were made. The results are set out in Table 2:

TABLE 2

| Duration of test (hours) | Quantity of crude CPD used (g./h.) | Molar ratio H₂:CPD | Residence time (seconds) | Reaction temp. (° C.) | H₂ waste gas (l./h.) | Cyclopentadiene conversion (percent) | Cyclopentene selectivity (percent) |
|---|---|---|---|---|---|---|---|
| 63 | 1,360 | 1.49 | 2 | 130 | 670 | 74.4 | 98.9 |
| 400 | 830 | 2.0 | 2.7 | 132 | 560 | 93.1 | 93.1 |
| 700 | 1,300 | 2.13 | 1.5 | 190 | 900 | 92.3 | 94.6 |

The catalyst does not show any changes in its activity after 700 hours. The molar ratio of hydrogen to cyclopentadiene was varied between 1.49 and 2.13 and the reaction temperature was increased from 130° C. to 190° C. After a start up period of 63 hours, conversions and selectivities all in excess of 90% were obtained even with twice the molar excess of hydrogen and under different loads.

EXAMPLE 3 (COMPARISON EXAMPLE)

The hydrogenation of cyclopentadiene was carried out on catalysts differing from the claimed catalysts (cf. Table 3) in the same apparatus and with the same starting material as in Example 1.

TABLE 3

| Catalyst | Molar ratio H₂:CPD | Residence time, sec. | Reactor temp. (outlet), °C | Cyclopentadiene conversion, percent | Cyclopentene selectivity, percent | Cyclopentene yield, percent |
|---|---|---|---|---|---|---|
| F | 1.0 | 0.75 | 70 | 26 | 90 | 23.4 |
| F | 1.0 | 0.75 | 120 | 8 | 89 | 7.1 |
| G | 1.0 | 0.1 | 60 | 38 | 37 | 14.0 |
| H | 1.0 | 0.75 | 50 | 30 | 72 | 21.6 |
| K | 1.0 | 0.5 | 50 | 85 | 62 | 52.7 |

NOTE.—
F=0.35% of Pd plus 0.1% of Cu on Li/Al spinel.
G=0.5% of Pd on Li/Al spinel.
H=Catalyst C 31-1 produced by Catalysts and Chemicals Inc. (Pd on Al₂O₃).
K=Catalyst G 68, a product of Messrs. Girdler (Pd on Al₂O₃).

A lithium/aluminum spinel with a Li content of 2.5% and an inner surface of 14 m.²/g. of the kind described in Example 1 was used as the supporting material for catalysts F and G.

To prepare catalyst F containing 0.35% of Pd and 0.1% of Cu, 600 ml. of Li/Al spinel were impregnated in a rotary evaporator at 60° C. with 250 ml. of a benzene solution in which 9.1 g. of palladium-acetonyl-acetonate had been dissolved at 60° C. The catalyst was dried in a vacuum drying cabinet for 1 hour at 80° C.

Catalyst G was prepared as catalyst A (from Example 1), but only with Pd salt.

The significant disadvantage of the comparison catalysts F, G, H and K in relation to the catalysts according to the invention are the considerably poorer cyclopentene yields obtained under comparable reaction conditions.

It will be appreciated that the instant specification and examples are set forth by the way of illustration and not limitation and that various modifications and changes may be made without departing from the spirit and scope of the present invention.

What is claimed is:

1. The process for the production of cyclopentene from cyclopentadiene which comprises partially hydrogenating cyclopentadiene with molecular hydrogen in the gas phase at a temperature above about 50° C. in the presence of a catalyst comprising a support containing as active material about 0.1 to 2% of metallic palladium with addition of about 0.2 to 2% of at least one metal selected from the group consisting of chromium, titanium and mixtures thereof.

2. A process according to claim 1, wherein the temperature is about 50 to 300° C.

3. A process according to claim 2, wherein the support comprises a lithium/aluminum spinel having a lithium content of up to about 2.6% by weight and an inner surface of up to about 100 m.$^2$/g.

4. A process according to claim 2, wherein the palladium content is about 0.2 to 1%, and the content of chromium and/or titanium is at least about 0.5%, with neither being present in excess of about 1.5%.

5. A process according to claim 4, wherein the support comprises a lithium/aluminum spinel having a lithium content of about 2.4 to 2.6% by weight and an inner surface of about 10 to 30 m.$^2$/g.

6. A process according to claim 5, wherein the catalyst has a palladium content of approximately 0.7% and a chromium content of approximately 1%, and the support has an inner surface of approximately 14 m.$^2$/g.

7. A process according to claim 5, wherein the catalyst has a palladium content of approximately 0.4% and a titanium content of approximately 1.4% and the support has an inner surface of approximately 14 m.$^2$/g.

8. A process according to claim 5, wherein the catalyst contains approximately 0.5% of palladium, approximately 0.7% of chromium and approximately 0.6% of titanium the support having a lithium content of approximately 2.5% and an inner surface of approximately 14 m.$^2$/g.

References Cited

UNITED STATES PATENTS

| 2,360,555 | 10/1944 | Evans et al. | 260—666 A |
| 2,793,238 | 5/1957 | Banes et al. | 260—666 A |
| 3,336,404 | 8/1967 | Chappell | 260—666 A |

DANIEL E. WYMAN, Primary Examiner

A. P. DEMERS, Assistant Examiner

U.S. Cl. X.R.

252—465, 466 PT; 260—677 H